(12) United States Patent
Kim et al.

(10) Patent No.: US 10,160,496 B2
(45) Date of Patent: Dec. 25, 2018

(54) STRUCTURE OF SIDE SILL FOR VEHICLE

(71) Applicant: Hyundai Motor Company, Seoul (KR)

(72) Inventors: Daesu Kim, Anyang-si (KR); Huensick Min, Hwaseong-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/497,795

(22) Filed: Apr. 26, 2017

(65) Prior Publication Data

US 2018/0154944 A1 Jun. 7, 2018

(30) Foreign Application Priority Data

Dec. 7, 2016 (KR) .................... 10-2016-0165817

(51) Int. Cl.
*B62D 21/15* (2006.01)
*B62D 25/02* (2006.01)
*B62D 27/02* (2006.01)

(52) U.S. Cl.
CPC ......... *B62D 21/157* (2013.01); *B62D 25/025* (2013.01); *B62D 27/023* (2013.01)

(58) Field of Classification Search
CPC ................ B62D 25/025; B62D 21/157
USPC .................... 296/209, 187.12, 198
See application file for complete search history.

(56) References Cited

U.S. PATENT DOCUMENTS

| | | | | |
|---|---|---|---|---|
| 9,701,347 | B2* | 7/2017 | Kaneko | B62D 25/02 |
| 2010/0207428 | A1* | 8/2010 | Fukushima | B62D 25/02 296/203.03 |
| 2014/0062130 | A1* | 3/2014 | Yoshimura | B62D 21/157 296/187.08 |
| 2014/0292031 | A1* | 10/2014 | Nydam | B62D 25/025 296/187.12 |
| 2015/0353139 | A1* | 12/2015 | Lebmeister | B62D 27/023 296/193.06 |
| 2016/0107700 | A1* | 4/2016 | Kaneko | B62D 25/02 296/193.05 |
| 2016/0200369 | A1* | 7/2016 | Ruess | B62D 25/025 296/193.06 |
| 2018/0029646 | A1* | 2/2018 | Kanagai | B62D 25/025 |

* cited by examiner

*Primary Examiner* — Jason S Morrow
(74) *Attorney, Agent, or Firm* — Morgan, Lewis & Bockius LLP

(57) ABSTRACT

A structure of a side sill for a vehicle extending in a lengthwise direction of the vehicle may include a side sill including an internal side sill panel and an external side sill panel coupled to each other with a wheel extension panel connected to a quarter panel and interposed between the internal side sill panel and the external side sill panel. Here, a rear end portion of the external side sill panel extends to the wheel extension panel as a single piece and upper and lower end portions of the external side sill are weld-jointed to the wheel extension panel.

5 Claims, 3 Drawing Sheets

STRUCTURE OF SIDE SILL FOR VEHICLE

CROSS-REFERENCE TO RELATED APPLICATION(S)

The present application priority to Korean Patent Application No. 10-2016-0165817, filed on Dec. 7, 2016, the entire contents of which is incorporated herein for all purposes by this reference.

BACKGROUND OF THE INVENTION

Field of the Invention

The present invention relate to a structure of a side sill for vehicles, and more particularly, to a structure of a side sill located at a quarter panel side of a vehicle and having excellent stability against a side collision of the vehicle.

Description of Related Art

In general, during a side collision of a vehicle, a lower part of a vehicle body, i.e., a side sill, is seriously deformed due to a concentrated stress therein. As a deformation degree of the side sill increases and an amount of central fillers introduced into the vehicle increases, occupants may be damaged more seriously.

That is, a side sill has a structure in which an internal panel and an external panel are assembled to form a predetermined compartment. However, since such structure of the side sill has insufficient rigidity to prevent deformation of the side sill during a side collision of the vehicle, it is difficult to inhibit deformation of the side sill.

In addition, although the side sill extends in a lengthwise direction of the vehicle, the side sill cannot reach the quarter panel but is disconnected from the quarter panel. Since a material and a shape of a connection member for connection between the side sill and the quarter panel are rapidly deformed, the connection member cannot withstand a collision load during a side collision but is plastically deformed. Thus, a collision load cannot be uniformly transmitted to a rear floor.

That is, a coupling structure of a side sill, a rear floor, and a quarter panel cannot have rigidity sufficient to withstand a collision load during a side collision. Thus, the amount of fillers introduced into the vehicle increases due to plastic deformation of the side sill, and the passengers may be more seriously damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of a side sill of a vehicle to reduce deformation of a vehicle body and damages of occupants by reducing deformation of the side sill and uniformly transmitting a collision load during a side collision.

Additional aspects of the invention will be set forth in part in the description which follows and, in part, will be obvious from the description, or may be learned by practice of the invention.

According to various aspects of the present invention, a structure of a side sill for a vehicle extending in a lengthwise direction of the vehicle, the structure includes a side sill including an internal side sill panel and an external side sill panel coupled to each other with a wheel extension panel connected to a quarter panel and interposed between the internal side sill panel and the external side sill panel. Here, a rear end portion of the external side sill panel extends to the wheel extension panel as a single piece and upper and lower end portions of the external side sill are weld-jointed to the wheel extension panel.

Also, an external reinforcing side sill panel may be disposed on the external side sill panel, and a lower end portion of the external reinforcing side sill panel may be weld-jointed to an external plate of the external side sill panel, and an upper end portion of the external reinforcing side sill panel may be disposed in contact with the quarter panel with a clearance therefrom.

In addition, the internal side sill panel may include a front internal side sill panel disposed below a door of the vehicle and a rear internal side sill panel connected to the front internal side sill panel and weld-jointed to the wheel extension panel, and the rear internal side sill panel may in contact with a reinforcing frame connected to a rear floor panel of the vehicle.

Additionally, an upper end portion of the wheel extension panel may be weld-jointed in a state of being interposed between the quarter panel and the rear internal side sill panel, and a lower end portion of the wheel extension panel may be weld-jointed in a state of being interposed between the external side sill panel and the rear internal side sill panel.

Also, an upper end portion of the external side sill panel may be weld-jointed to the wheel extension panel at a position lower than an upper end portion of the rear internal side sill panel.

In addition, a lower portion of a wheel guard of the quarter panel may cut to prevent interference by a rear end portion of the external side sill panel, and a cut portion of the wheel guard may be covered by a wheel guard extension member connected to an external portion of the external side sill panel.

The methods and apparatuses of the present invention have other features and advantages which will be apparent from or are set forth in more detail in the accompanying drawings, which are incorporated herein, and the following Detailed Description, which together server to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION

Reference will now be made in detail to the various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

Figure 1:
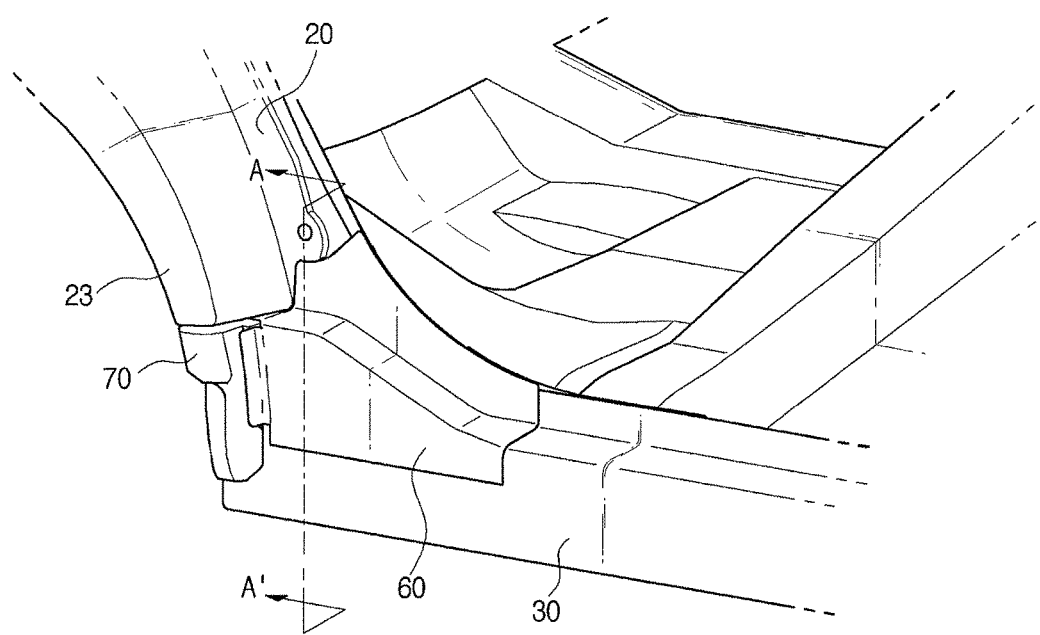
FIG. 1 is a perspective view illustrating a side sill at a quarter panel side of a vehicle according to an exemplary embodiment.
Figure 2:
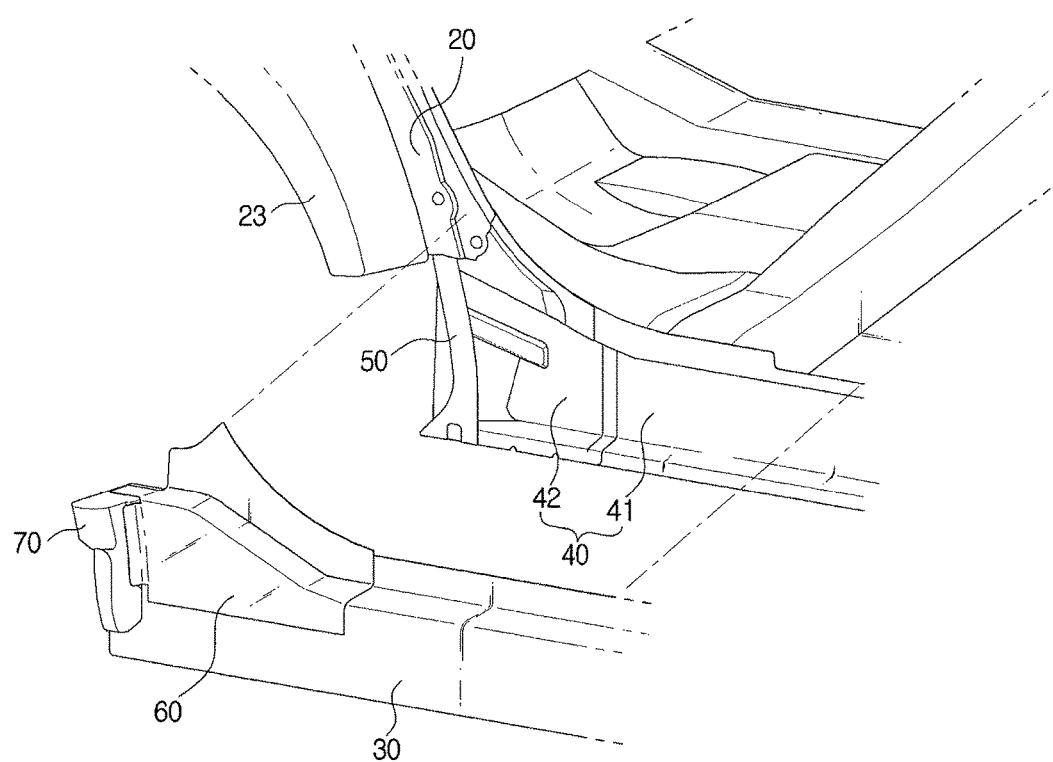
FIG. 2 is an exploded view of the side sill at the quarter panel side of the vehicle.
Figure 3:
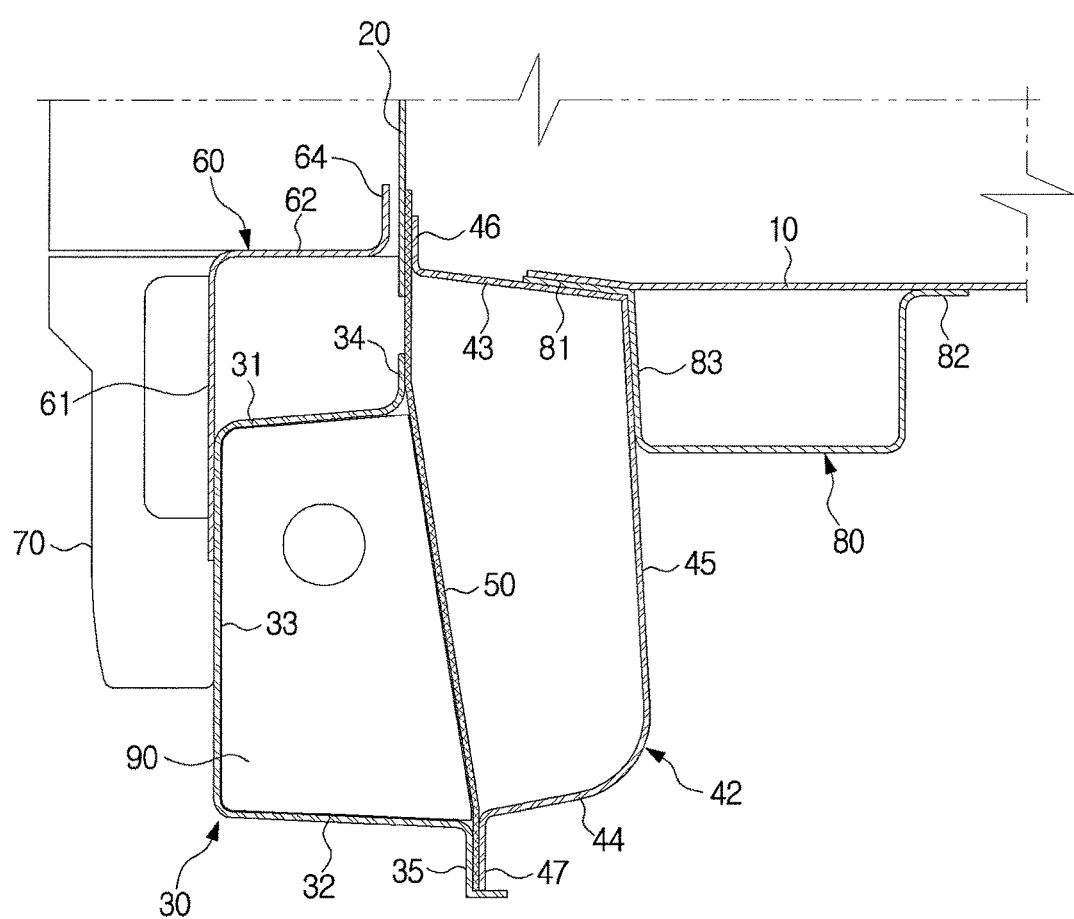
FIG. 3 is a cross-sectional view taken along line A-A'.

FIG. 1 is a perspective view illustrating a side sill at a quarter panel side of a vehicle according to an exemplary embodiment. FIG. 2 is an exploded view of the side sill at the quarter panel side of the vehicle. FIG. 3 is a cross-sectional view taken along line A-A'.

Referring to FIG. 1 to FIG. 3, structures of side sills of a vehicle according to an exemplary embodiment are disposed below doors of the vehicle and extend in a lengthwise direction of the vehicle in a state of being respectively coupled to both sides of a floor panel 10 of a vehicle body. The structures of the side sills increase rigidity of a lower portion of the vehicle body, absorb external impact applied to front and sides of the vehicle, and protect an internal compartment for occupants by reducing deformation of the floor panel 10.

A structure of the side sill according to the embodiment connected to a quarter panel 20 of the vehicle and located at a rear portion of the vehicle and includes an external side sill panel 30 having a length extending to the quarter panel 20, i.e., a wheel extension panel 50 connected to the quarter panel 20, to prevent rapid cross-sectional deformation caused by a rotational moment generated during a side collision of the vehicle. That is, a conventional external side sill panel does not extend to the quarter panel 20 in a form separated therefrom. Thus, the quarter panel 20 is connected to the external side sill panel via a separate external reinforcing side sill panel. Since cross-sections of the quarter panel and the external side sill panel are rapidly deformed at connection portions, and plastic deformation is caused during a side collision due to different materials and thicknesses thereof, a load cannot be uniformly transmitted to the floor panel 10.

An internal side sill panel 40 coupled to the external side sill panel 30 includes a front internal side sill panel 41 disposed below a rear door and a rear internal side sill panel 42 disposed adjacent to the quarter panel 20 of the rear side of the vehicle.

The external side sill panel 30 is coupled to the rear internal side sill panel 42 with the wheel extension panel 50 disposed therebetween.

The external side sill panel 30 includes an external upper plate 31, an external lower plate 32 disposed below the external upper plate 31 to be separated apart therefrom by a predetermined distance, and an external plate 33 connecting the external upper plate 31 with the external lower plate 32 and facing the outside of the vehicle.

An external upper joint 34 and an external lower joint 35 bending in opposite directions are respectively provided at end portions of the external upper plate 31 and the external lower plate 32 to be weld-jointed to the wheel extension panel 50.

Since the external upper joint 34 and the external lower joint 35 are respectively weld-jointed to the upper and lower portions of the wheel extension panel 50, the external side sill panel 30 is stably supported and rapid cross-sectional deformation thereof caused by a distortion load generated during a side collision may be prevented.

The rear internal side sill panel 42 includes an internal upper plate 43, an internal lower plate 44 disposed below the internal upper plate 43 to be separated apart therefrom by a predetermined distance, and an internal plate 45 connecting the internal upper plate 43 with the internal lower plate 44 and facing the inside of the vehicle.

An internal upper joint 46 and an internal lower joint 47 bending in opposite directions are respectively provided at end portions of the internal upper plate 43 and the internal lower plate 44 to be weld-jointed to the wheel extension panel 50.

The rear internal side sill panel 42 is coupled to the wheel extension panel 50 by welding the internal upper joint 46 and the internal lower joint 47 respectively to upper and lower portions of the wheel extension panel 50.

The wheel extension panel 50 is interposed between the external side sill panel 30 and the rear internal side sill panel 42, and the upper end portion thereof is jointed to the quarter panel 20 by welding.

The lower end portion of the wheel extension panel 50 is welded in a state of being interposed between the external lower joint 35 of the external side sill panel 30 and the internal lower joint 47 of the rear internal side sill panel 42, and the upper end portion of the wheel extension panel 50 is welded in a state of being interposed between the internal upper joint 46 of the rear internal side sill panel 42 and the lower end of the quarter panel 20.

Also, the external upper joint 34 of the external side sill panel 30 is weld-jointed to a position lower than the upper end portion of the wheel extension panel 50 to which the internal upper joint 46 is weld-jointed.

An external reinforcing side sill panel 60 is connected to an upper portion of the external side sill panel 30.

The external reinforcing side sill panel 60 includes an external reinforcing side plate 61 weld-jointed to the external plate 33 of the external side sill panel 30 at a lower end portion thereof, an external reinforcing upper plate 62 bending toward the internal compartment of the vehicle from the upper end portion of the external reinforcing side plate 61 to cover the upper portion of the external upper plate 31 of the external side sill panel 30, and an upper cover plate 64 bending upward from the end portion of the external reinforcing upper plate 62 and disposed to face the quarter panel 20 with a clearance therefrom but not weld jointed thereto.

Since the external side sill panel 30 extends to the quarter panel 20, a lower end portion of a wheel guard 23 of the quarter panel 20 is partially cut. A wheel guard extension member 70 is disposed at the cut portion connected to a rearmost end of the external side sill panel 30, constituting a lower portion of the wheel guard 23.

One side of a reinforcing frame 80 is seated on the internal plate 45 of the rear internal side sill panel 42 and weld-jointed thereto. The reinforcing frame 80 forms a bottom of an internal of the vehicle and is coupled to a bottom surface of the floor panel 10 constituting the rear portion of the body.

The reinforcing frame 80 has a box shape with an open top, i.e., a U-shaped cross-section, and joint flanges 81 and 82 bending from both ends thereof may be weld-jointed to the bottom surface of the floor panel 10.

Also, one joint flange 81 of the reinforcing frame 80 is interposed between the internal upper plate 43 of the rear internal side sill panel 42 and the floor panel 10. A side 83 bending downward from one end of the joint flange 81 is disposed to be in contact with the internal plate 45 of the rear internal side sill panel 42. The reinforcing frame 80 absorbs and distributes an impact load applied to the floor panel 10 via the side sill during a side collision. A side sill patch 90 covers a rear opening of the side sill.

Through the present configuration, when a collision load is applied to a B pillar of the body, a load of a rotational moment generated around the side sill connected to the quarter panel 20 is transmitted to the wheel extension panel 50 via the external side sill panel 30 and the external reinforcing side sill panel 60. Next, the load of the rotational moment is transmitted to the reinforcing frame 80 and the floor panel 10 via the rear internal side sill panel 42 connected to the wheel extension panel 50.

In the present process, since the cross-section of the external side sill panel 30 having structural rigidity is not rapidly deformed, the load of the rotational moment applied to the external side sill panel 30 is distributed to the external reinforcing side sill panel 60 without being blocked and uniformly transmitted to the reinforcing frame 80 and the floor panel 10 via the wheel extension panel 50. Therefore, deformation of the side sill may be reduced. Thus, a degree of intrusion of the side sill and a center pillar into the internal of the vehicle decreases during a side collision and damages applied to occupants may also decrease.

As is apparent from the above description, since the coupling structure of the side sill at the quarter panel side of the vehicle is improved according to an exemplary embodiment of the present invention, a collision load generated during a side collision may be uniformly distributed by preventing a rapid cross-sectional deformation of the side sill, so that deformation of the vehicle body and damages to occupants may be reduced.

For convenience in explanation and accurate definition in the appended claims, the terms "upper", "lower", and "outer", "up", "down", "upper", "lower", "upwards", "downwards", "front", "rear", "back", "inside", "outside", "inwardly", "outwardly", "interior", "exterior", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a side sill for a vehicle extending in a lengthwise direction of the vehicle, the structure comprising:
   the side sill including an internal side sill panel and an external side sill panel coupled to each other with a wheel extension panel connected to a quarter panel and interposed between the internal side sill panel and the external side sill panel,
   wherein a rear end portion of the external side sill panel extends to the wheel extension panel as a single piece and upper and lower end portion's of the external side sill are weld-jointed to the wheel extension panel, and
   wherein an outer reinforcing side sill panel is disposed on the outer side sill panel, and a lower end of the outer reinforcing side sill panel is weld-jointed to an outer plate of the outer side sill panel, and an upper end of the outer reinforcing side sill panel is disposed to face the quarter panel with a clearance therefrom.

2. The structure of the side sill for the vehicle according to claim 1, wherein the internal side sill panel includes a front internal side sill panel disposed below a door of the vehicle and a rear internal side sill panel connected to the front internal side sill panel and weld-jointed to the wheel extension panel, and
   the rear internal side sill panel is in contact with a reinforcing frame connected to a rear floor panel of the vehicle.

3. The structure of the side sill for the vehicle according to claim 2, wherein an upper end portion of the wheel extension panel is weld-jointed in a state of being interposed between the quarter panel and the rear internal side sill panel, and a lower end portion of the wheel extension panel is weld-jointed in a state of being interposed between the external side sill panel and the rear internal side sill panel.

4. The structure of the side sill for the vehicle according to claim 2, wherein an upper end portion of the external side sill panel is weld-jointed to the wheel extension panel at a position lower than an upper end portion of the rear internal side sill panel.

5. The structure of the side sill for the vehicle according to claim 1, wherein a lower portion of a wheel guard of the quarter panel is cut to prevent interference by the rear end portion of the external side sill panel, and
   a cut portion of the wheel guard is covered by a wheel guard extension member connected to an external portion of the external side sill panel.

* * * * *